Jan. 6, 1959 R. S. VOGLER 2,867,266
CRASH PADS FOR VEHICLE SEAT BACKS
Filed Nov. 30, 1956 2 Sheets-Sheet 1
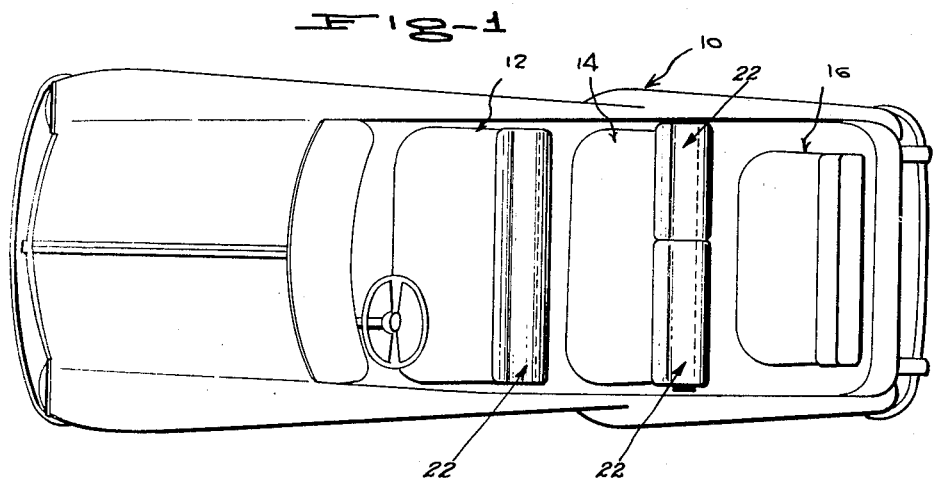
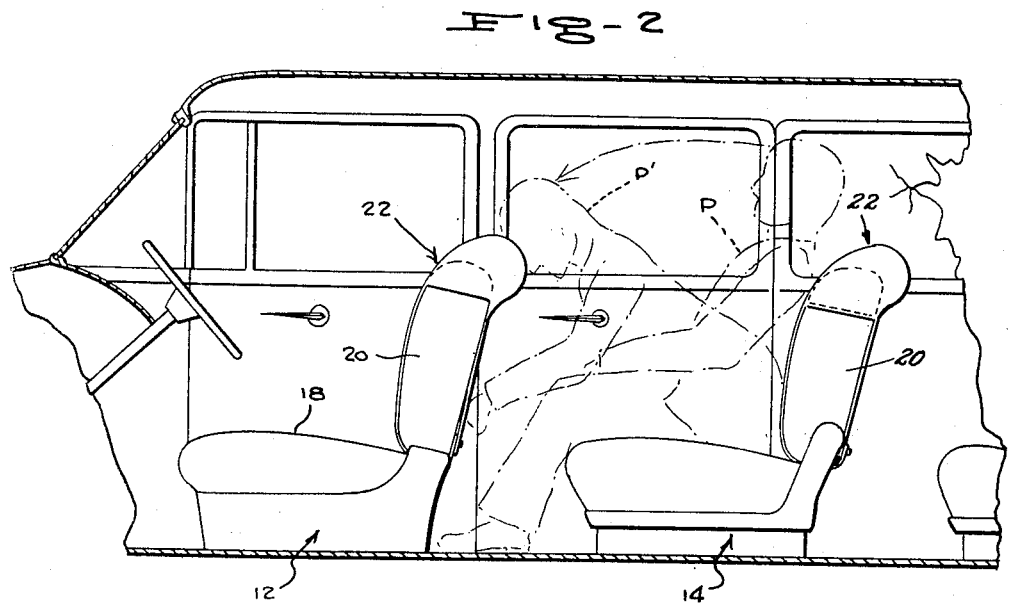
INVENTOR.
RICHARD S. VOGLER
BY
ATTORNEYS Jan. 6, 1959  R. S. VOGLER  2,867,266
CRASH PADS FOR VEHICLE SEAT BACKS
Filed Nov. 30, 1956  2 Sheets-Sheet 2
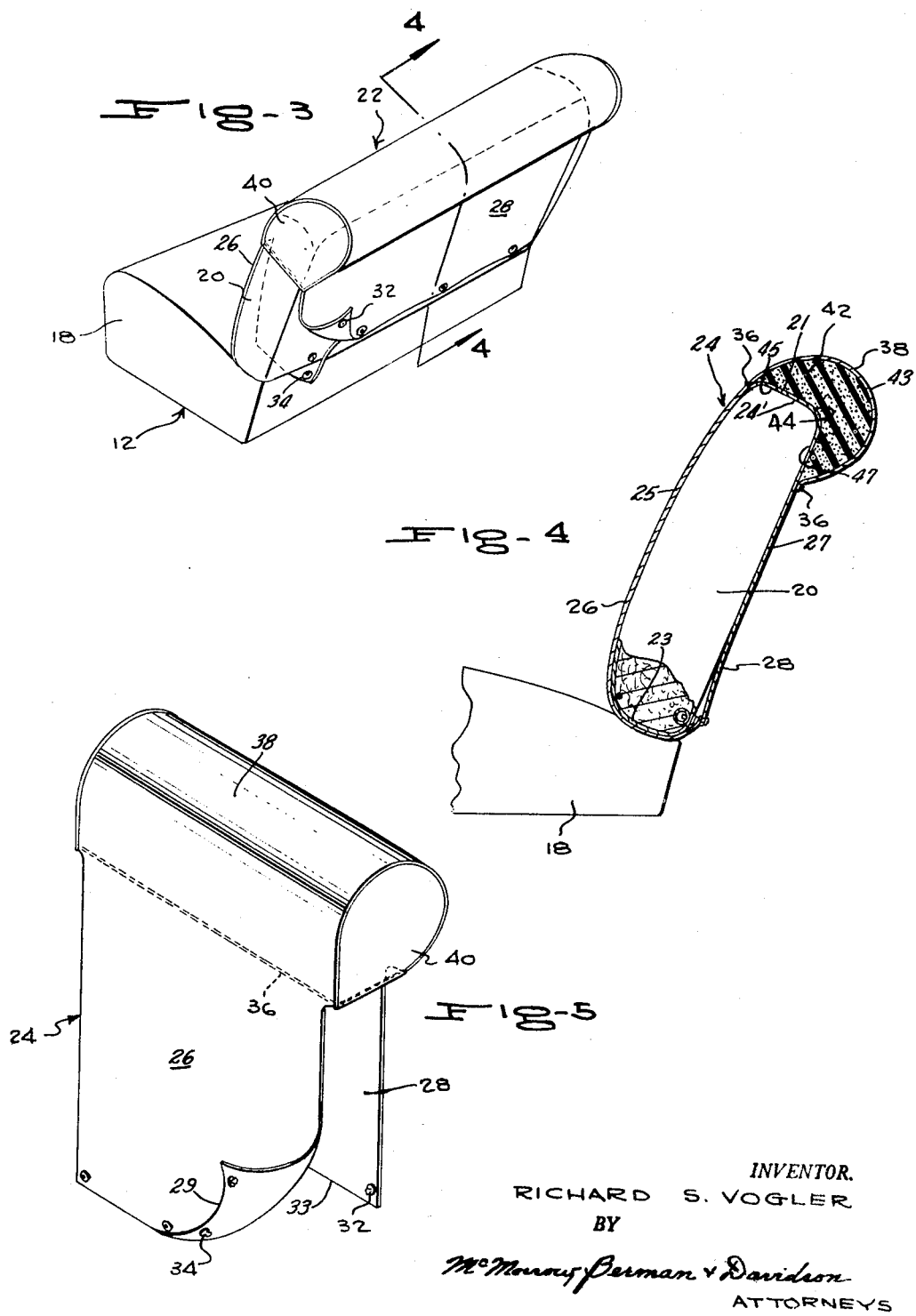
INVENTOR.
RICHARD S. VOGLER
BY
McMurray, Berman & Davidson
ATTORNEYS

United States Patent Office 2,867,266
Patented Jan. 6, 1959

2,867,266

CRASH PADS FOR VEHICLE SEAT BACKS

Richard S. Vogler, Carbondale, Ill.

Application November 30, 1956, Serial No. 625,493

2 Claims. (Cl. 155—188)

This invention relates to improved crash pad attachments for vehicle seat backs.

The primary object of the invention is to provide more practical, reliable and efficient devices of this kind which are in the form of seat covers adapted to be removably installed on vehicle seat backs of either the stationary or hinged types, or of the solid or split types, the seat covers having thereon crash pads which are shaped to conform to the top edges and upper portions of the rear sides of the seat backs and to project above the top edges and rearwardly beyond the rear sides of the seat backs.

Another object of the invention is to provide crash pad attachments of the character indicated, which can be made in attractive, rugged, and serviceable forms at relatively low cost, are easily installed and removed, and are highly acceptable for the purpose intended.

These together with other objects and advantages which will become apparent reside in the details of construction as more fully hereinafter described and claimed, reference being had to the accompanying drawings forming a part hereof, wherein like numerals refer to like parts throughout the several views, and in which:

Figure 1 is a top plan view of a vehicle having longitudinally spaced seats having backs on which are installed crash pad attachments of the invention, the roof of the vehicle having been removed;

Figure 2 is an enlarged fragmentary vertical longitudinal section through said vehicle, showing the manner in which a passenger may be thrown forward against a seat back;

Figure 3 is a rear perspective view of a vehicle seat having a back on which a crash pad attachment of the invention is installed;

Figure 4 is a vertical transverse section taken substantially on the plane of line 4—4 of Figure 3; and Figure 5 is an enlarged front perspective view of a crash pad attachment, per se.

Referring to the drawings in detail, a vehicle 10, such as a station wagon, is shown which has a plurality of longitudinally spaced seat assemblies, indicated generally at 12, 14 and 16. Passengers seated on the seat assembly 14 will be thrown forwardly toward the seat assembly 12 during sudden stops, and passengers seated on the seat assembly 16 will be similarly thrown forwardly toward the seat assembly 14.

The seat assembly 12, which is similar to the seat assemblies 14 and 16, comprises a horizontal seat pad 18 and a vertically extending back 20. The back 20 has an upper end 21, a lower end 23, and front and back sides 25 and 27.

The illustrated crash pad assembly, indicated generally at 22, comprises an elongated flexible cover panel 24, substantially as wide as a seat back 20. The panel 24 includes an intermediate portion 24' which is trained over the upper end 21 of the seat back 20, a relatively long front flight 26 which engages the front side 25 of the seat back 20, and is trained under the lower end 23 of the back 20, and terminates in a free edge 29. The panel 24 also includes a rear flight 28 which engages the rear side 27 of the seat back 20, is shorter than the front flight 26, and terminates in a free edge 33 which is preferably spaced above the lower end 23 of the seat back 20. The free edges 29 and 33 have cooperating snap fastener elements 34 and 32 thereon, which are engaged, with these edges overlapped, to secure the free edges together and hold the cover panel 24 in place.

A crash pad or bolster 42 of foam rubber or other suitable resilient and compressible material, is convex on its upper and rear sides, as indicated at 43, and has in its forward and downward sides a V-shaped longitudinal recess 44 having front and rear sides 45 and 47 which conform to and engage the upper end 21 of the seat back 20 and an upper portion of the rear side 27 of the seat back 20, respectively, so that the pad 42 projects upwardly from and rearwardly beyond the upper end of the seat back 20, in a position to absorb the shock of a passenger thrown forward from a next rear seat in a vehicle.

Trained around the convex upper side 43 of the pad 42 is a sheet 38 of flexible material, which is secured at its front and rear edges, as by sewing 36, to the front flight 26 and the rear flight 28 of the cover panel 24. Secured on and across the ends of the sheet 38 are end panels 40 which engage the ends of the seat back 20 and prevent lateral shifting of the attachment on the seat back 20. The crash pad attachments can be easily removed from seat backs of the folding type by tilting such backs forwardly and separating the fastener elements 32 and 34.

The foregoing is considered as illustrative only of the principles of the invention. Since numerous modifications and changes will readily occur to those skilled in the art, it is not desired to limit the invention to the exact construction and operation shown and described, and accordingly, all suitable modifications and equivalents may be resorted to, as fall within the scope of the appended claims.

What is claimed is:

1. A vehicle seat back crash pad comprising a body of resilient compressible material having a cross section larger than the thickness of a vehicle seat back, said body having top and rear sides which are convex while the body is uncompressed, the convexities of the top and rear sides being substantially continuous with each other, said body having intersecting bottom and front surfaces for several engagement with the top and the rear side of a vehicle seat back, and securing means secured to and depending from said body for securement on the front and rear sides of a vehicle seat back.

2. In combination, a vehicle seat having front and rear sides and an upper end, an elongated flexible cover panel having an intermediate portion conformably trained over said upper end and front and rear flights depending along said front and rear sides, a pad of resilient compressible material secured upon said intermediate portion and upon said rear flight, said pad being thicker than said seat back and having a forward portion overlying said upper end of the seat back and a rearward portion lying along said rear side of the seat back, said forward and rearward portions of the pad being integral with each other.

References Cited in the file of this patent

UNITED STATES PATENTS

| 1,220,555 | Reid | Mar. 27, 1917 |
| 1,698,968 | Rubenstien | Jan. 15, 1929 |
| 2,013,481 | Stonehill | Sept. 3, 1935 |
| 2,229,160 | Wittcoff | Jan. 21, 1941 |
| 2,626,163 | Scantlebury | Jan. 20, 1953 |
| 2,653,651 | Nemmer | Sept. 29, 1953 |

FOREIGN PATENTS

| 311,944 | Italy | Oct. 16, 1933 |
| 854,850 | France | Jan. 29, 1940 |